March 31, 1970 YOJI SUMIDA ET AL 3,504,111

COMPENSATING SYSTEM FOR COLOR PHASE DEVIATION OF VTR-REPRODUCED SIGNAL

Filed Oct. 24, 1966 6 Sheets-Sheet 3

March 31, 1970 YOJI SUMIDA ET AL 3,504,111

COMPENSATING SYSTEM FOR COLOR PHASE DEVIATION
OF VTR-REPRODUCED SIGNAL

Filed Oct. 24, 1966 6 Sheets-Sheet 4

United States Patent Office 3,504,111
Patented Mar. 31, 1970

3,504,111
COMPENSATING SYSTEM FOR COLOR PHASE DEVIATION OF VTR-REPRODUCED SIGNAL

Yoji Sumida and Toshihide Habutsu, Tokyo, Japan, assignors to Japan Broadcasting Corporation, Tokyo, Japan Filed Oct. 24, 1966, Ser. No. 588,874
Claims priority, application Japan, Nov. 16, 1965, 40/70,079
Int. Cl. H04n 5/38, 5/44
U.S. Cl. 178—5.4 5 Claims

ABSTRACT OF THE DISCLOSURE

A compensating system for a color phase deviation of a NTSC color television signal reproduced from a video tape recorder, by controlling the delay time of a variable delay circuit by means of a compensating signal. The compensating signal is a superposed signal of a zero-order hold type compensating signal and a linear interpolator type compensating signal. The zero-order hold type compensating signal is formed by a comparison of phase of each burst signal included in the reproduced signal with that of a reference subcarrier wave and holding the detected phase difference for a horizontal scanning period. The linear interpolator type compensating signal is formed by a comparison between phases of adjacent burst signals in the reproduced signal. The system of the invention has a means to prevent a production of any erroneous compensating signal even at a discontinuous point of the reproduced composite signal caused by a switching of each of the reproducing equipment.

This invention relates to a magnetic recording and reproducing device (hereinafter called as VTR) which records and reproduces a color television signal by a magnetic tape. More especially this invention relates to a system for compensating time base deviation of a VTR-reproduced signal reproduced from magnetic tape of a VTR equipment with special high accuracy.

In such a system it is most important to obtain an exact coincidence of mechanical and electrical functions of the device for both at recording and reproducing of a signal. However, it was very difficult to obtain such a precise coincidence. Therefore a most significant problem to be solved in the VTR reproducing technique is to solve such time base deviation caused by unequality of recording and reproducing characteristics of the VTR equipment. This requirement has still more importance in case of the NTSC (National Television Systems Committee in the U.S.A.) color television transmission system, in which the chrominance component of the color television signal is represented by a carrier chrominance signal, which is phase-modulated by hue information and amplitude-modulated by color information. In such NTSC color television signal reproducing system, it is usually requested to keep such time base deviation less than 5 nano second (6 degree in phase angle of 3.58 mc. subcarrier wave). However, such accuracy is rather impossible to obtain in the reproduced signal of VTR equipment, which inevitably comprises a mechanical element, by only improving the accuracy of the mechanical components.

In known VTR equipment, known as Ampex type—the trade name—which is provided with four recording heads of lateral scanning type, it is still more difficult to obtain such coincidence of functions by the reason that is provided a plurality of recording heads and also using rotating heads, therefore it was impossible to obtain such stability of time base with high accuracy without using an electric time base compensating equipment, which is able to compensate the time base deviation of the reproduced signal with fine accuracy and a high speed.

As is mentioned above, the time base deviation in a reproduced signal of VTR equipment is caused by unequality of the mechanical and electrical functions of the equipment at recording and reproducing of a signal. In this respect, beside of a rotating jitter of the rotating heads, a difference of mechanical condition of a head at recording and reproducing acts a significant effect. FIG. 1 shows schematically such effect, in which RL is a locus of a head at recording and PL is a locus of the same head at reproducing of the signal. In the figure the meaning of each symbol is as follows:

01—Center of head at recording
02—Center of head at reproducing
$r1$—Radius of head at recording
$r2$—Radius of head at reproducing
$P1$—A position of head at recording
$P2$—A position of head at reproducing
$\theta_1$—Phase angle at recording
$\theta_2$—Phase angle at reproducing
$x$—Deviation of head in horizontal direction
$y$—Deviation of head in vertical direction As the causes of the mechanical deviation of head the following conditions are considered:

(1) $y=0,\ r1=r2=r$ $$\frac{d\theta_2}{dt} \doteq \left(1+\frac{x}{r}\cos\theta\right)\frac{d\theta_1}{dt}$$

(2) $x=0,\ r1=r2=r$ $$\frac{d\theta_2}{dt} \doteq \left(1+\frac{y}{r}\sin\theta\right)\frac{d\theta_1}{dt}$$

(3) $x=0,\ r2-r1=\Delta r$ $$\frac{d\theta_2}{dt} \doteq \left(1-\frac{\Delta r}{r}\right)\frac{d\theta_1}{dt}$$

As shown in FIG. 1, under conditions of above (1), (2) and (3), time base deviation may occur in the reproduced signal even if a signal including no time base deviation was recorded under constant angular velocity of $d\theta_1/dt$, owing to the deviation of reproducing angular velocity $d\theta_2/dt$. In the known system, a major part of time base deviation caused by rotating jitter of the rotary head may be eliminated by means of a high accurate electromechanic servo system which is controlled by rotating information signals in the reproduced signal and further time base deviation caused by the difference of angular velocity during the recording and reproducing is compensated by an electric correcting means controlled by a signal corresponding to the phase difference between a horizontal synchronizing signal in the reproduced signal a reference signal.

Moreover, in case the VTR equipment is used for reproduction of a NTSC color television signal a still further correcting measure should be employed for obtaining a precise correction of the phase of the color subcarrier wave in addition to the above mentioned two basic correcting means, which are required already in the case of VTR equipment for reproducing a monochromic television signal.

This third compensating means usually operates in principle by comparing the color burst signal contained in each of the horizontal synchronizing signals and in a reproduced color television signal with a reference signal and from the result of the comparison, the signal in the succeeding one horizontal period is corrected.

This known compensating principle is called zero-order hold type compensation. In such known zero-order hold type compensation a time base error compensating signal is formed from the above mentioned comparison between the phase of a color burst signal inserted in each horizontal synchronizing period (hereinafter abridged as 1H) and that of the reference subcarrier wave so as to compensate for the deviation at the time of the burst signal. Then the image signal in the succeeding 1H period is compensated by using the time base error compensating signal under assumption that the signal includes the same time base error during the whole 1H period from the burst signal.

However, said known zero-order hold type compensation of the phase of reproduced NTSC color television signal has a mitigation by a reason that the phase deviation of the reproduced signal during a 1H period is considerably large. For instance, in the actual case the reproduced color television signal from a VTR equipment shows a phase deviation of the color burst signal of about 100° during the 1H period. This means the reproduced color television signal has such a large phase deviation of about 100° in the phase between the beginning and the end of the signal for 1H period. By the known compensating principle even though the phase of 1H signal is corrected exactly at the beginning, the phase of the signal near the end of 1H signal shows intolerable amount of phase error. Under the existence of such large amount of phase error in the reproduced color television signal, a high quality color picture display is difficult and the time base error should be eliminated.

The present invention relates to an improvement of above-mentioned third compensating means.

The present invention has for its object to provide a novel apparatus being able to obtain a high time base stabilization in the reproduced signal reproduced from a wide band tape reproducing equipment.

Another object of the invention is to obtain an electronic automatic color phase deviation compensating equipment by utilizing color burst signals in a color television signal reproduced from magnetic recording and reproducing equipment.

Still a further object of this invention is to obtain a novel automatic color phase deviation compensating equipment able to compensate color phase deviation of a reproduced color television signal reproduced from a VTR equipment based on a principle called linear interpolator type compensation, in which a phase difference between two adjacent color burst signals is also taken into consideration.

Another object of the invention is to obtain a novel circuit arrangement for obtaining a correct linear interpolator type compensating signal in a proximity of head channel switching point in said Ampex type four-head VTR equipment.

Again further object of the invention is to obtain a novel circuit arrangement able to prevent a formation of incorrect linear interpolator type compensating signal at the proximity of the head channel switching point of Ampex type four-head VTR equipment and to derive an accurate linear interpolator type compensating signal.

A still further object of this invention is to obtain a novel automatic color phase deviation compensating equipment for compensating color phase deviation of a reproduced color television signal reproduced from VTR equipment, by means of a variable delay line and by controlling the delay time in accordance with the linear interpolator type compensating signal.

Above mentioned objects of this invention will fully be understood by the following explanation with referring to the accompanying drawings in which.

Figures 1, 2:
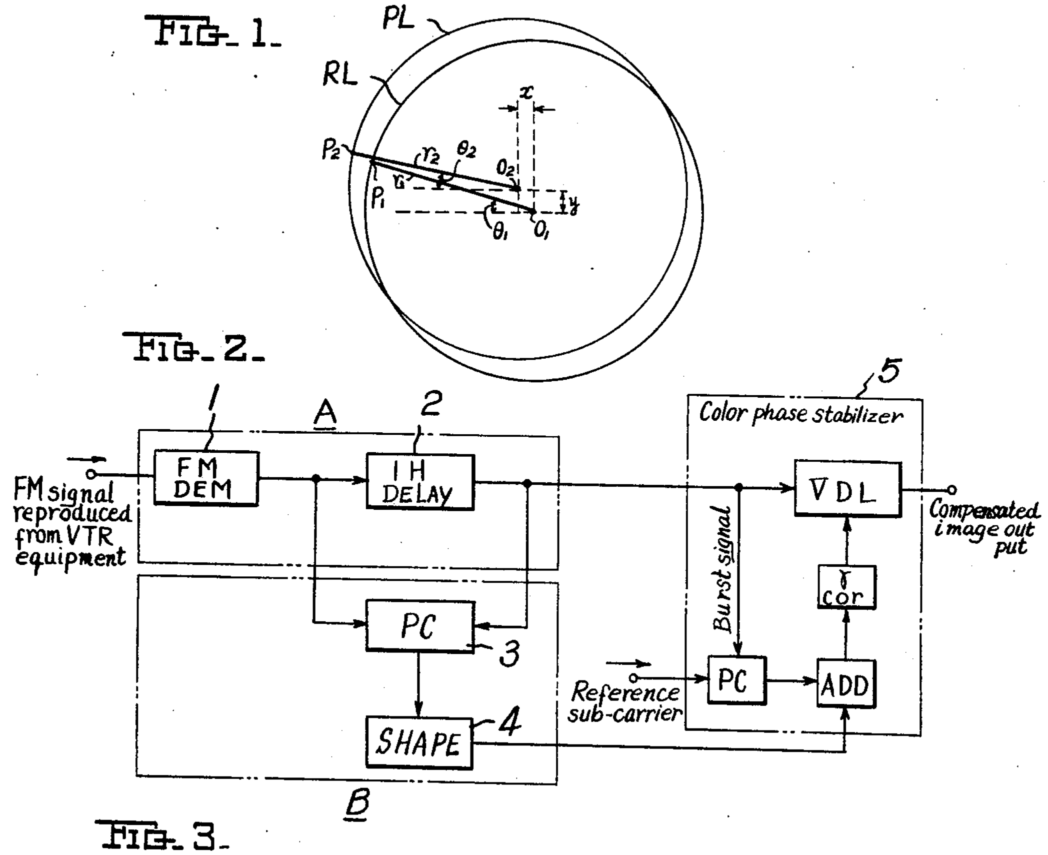
FIG. 1 is an explanatory diagram of the causes of time base deviation which may occur by a difference of relative position of the head mechanism at the recording and reproducing of a VTR equipment using rotary heads.
FIG. 2 is a block diagram showing a principle of forming a linear interpolator type compensating signal from a reference signal of VTR reproduced television signal by using 1H delay circuit, in which phase deviation is compensated by combining a variable delay circuit with a color phase stabilizer and controlling said circuit by the linear interpolator type compensating signal.
Figure 3:
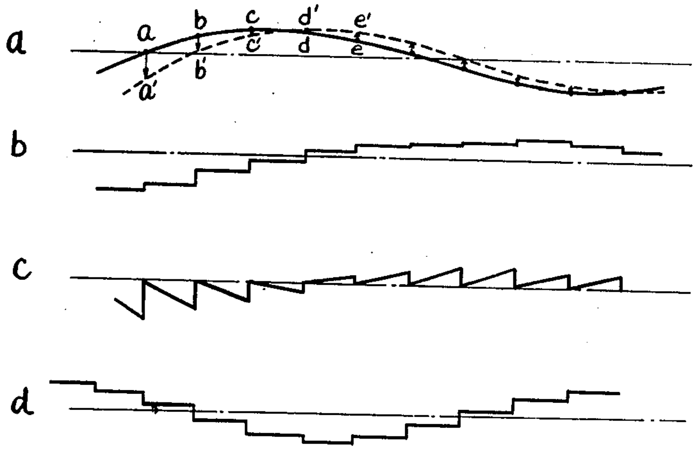
FIG. 3 shows several explanatory diagrams explaining the formation of the linear interpolator type compensating signal in FIG. 2.

A basic principle of the system of this invention will be described with referring to the block diagram as shown in FIG. 2 and signal wave forms shown in FIG. 3. In FIG. 2, 1 designates an FM signal demodulator. The demodulator 1 demodulates an FM signal which has been modulated by a color television signal and reproduced by the reproducing heads of a VTR equipment and supplies color television signal. It is assumed that this reproduced color television signal includes a phase deviation as shown by full line with respect to the center line for indicating non-deviation in FIG. 3*a*.

In FIG. 2, 2 is a delay line circuit delaying the reproduced color television signal for one horizontal scanning period, (hereinafter referred to as 1H.) As this delay circuit delays also the phase deviation, a 1H delayed signal having a wave form which is delayed with respect to the input signal as shown by dotted line of FIG. 3*a* will appear at the output terminal of the circuit.

The input and the output color television signals at the input and the output terminals of the delay circuit 2 are supplied to a phases comparator 3. In the comparator circuit the phase of burst signals in each of said signals are compared and a phase difference signal corresponding to the phase difference between each of the adjacent signals in the reproduced color television signal as shown by arrows *aa'*, *bb'* . . . in FIG. 3*a*, is derived at the output of the phase comparator 3.

4 is a shaping circuit, which forms a linear interpolator type approximate compensating signal having a character corresponding to the phase difference for each 1H period, and derives this signal from the phase difference the phase comparator 3. This shaping circuit 4 at first holds the level of the phase deviation signal at the position of burst signal for 1H period and forms a phase deviation signal as shown in FIG. 3*b*, then forms a sawtooth wave form linear interpolator type compensating signal as shown in FIG. 3*c* by a suitable means, for instance, by an integrating circuit, and which represents the respective wave, may be obtained by a control of RF switcher RFS. In this signal *s*, no discontinuous point exists between the burst signals 17 and 1' since these signals had been reproduced from a same reproducing head. Thus, the phase comparator 3 may always make a comparison between delayed and non-delayed burst signals belonging to a same reproducing head.

Figure 5:
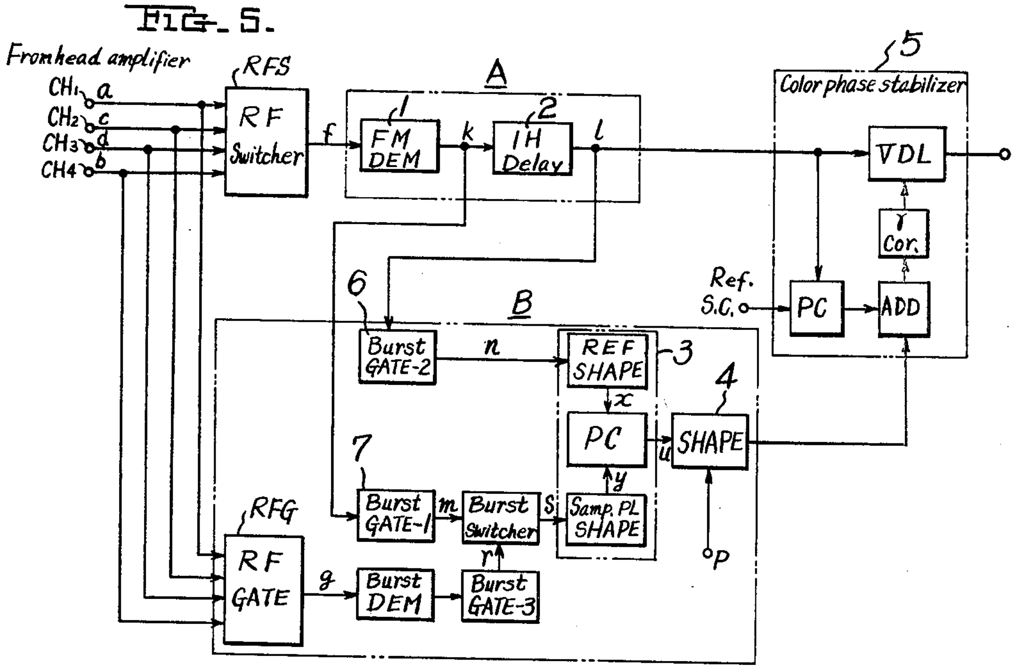
FIG. 5 is a block diagram of an automatic color phase deviation compensating equipment for forming an accurate linear interpolator type compensating signal at the proximity of head channel switching point of Ampex type four-head VTR equipment.
Figure 7:
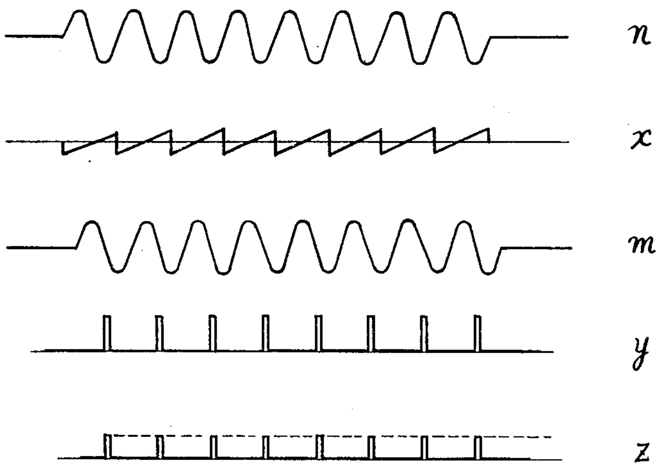

FIG. 7 is an explanative diagram of wave forms in the phase comparator stage 3 shown in FIG. 5, which consists of a reference wave form shaping circuit, sampling pulse shaping circuit and phase comparator circuit. In the diagram the burst signal portion is shown in a more enlarge scale.

The 1H delayed burst signal *n* shown in an enlarged scale in FIG. 7 *n* is converted into a sawtooth wave signal *x* having a zero voltage at a point of crossing of the axis to a negative direction by the reference wave form shaping circuit. The non-delayed burst signal *m* is fed through a burst switcher and converted into a narrow pulse *y* having the center at a point of crossing of the axis to negative direction by the sampling pulse shaping circuit. The signals *x* and *y* are fed to a phase comparator circuit and the signal *x* is sampled by the signal *y* to form a signal *z*. Therefore, the pulse series *z* is a signal having a polarity and an amplitude corresponding to the phase difference of the burst signals *n* and *m*. At every burst signal a suitable two directional peak detection is effected, and its potential is maintained for 1H period, then a signal *o* in FIG. 6 may be obtained.

The linear interpolator type compensating signal shaping circuit 4 includes, for instance, a sawtooth wave producing circuit of which starting and stopping time is controlled by a reset pulse *p* synchronized with the horizontal synchronizing signal of the reproduced image signal, and forms a sawtooth wave linear interpolator type compensating signal of the phase difference signal obtained from the phase comparator stage 3.

As the basic principle, a phase difference signal *o* is obtained by comparing the phase of the delayed and non-delayed burst signals *m* and *n*, and a linear interpolator type compensating signal *q* is derived therefrom as the manner described as above. However, as can be seen from FIG. 6, there is a portion in which the phase of burst signal 1 of diagram *m* and that of burst signal 17 of diagram *n* is compared. This comparison of said signals is meaningless according to the fact that said burst signals are by the discontinuous point due to head switching. The linear compensating signal *q* based on said comparison may cause erroneous compensation in the corresponding position.

Figure 6:
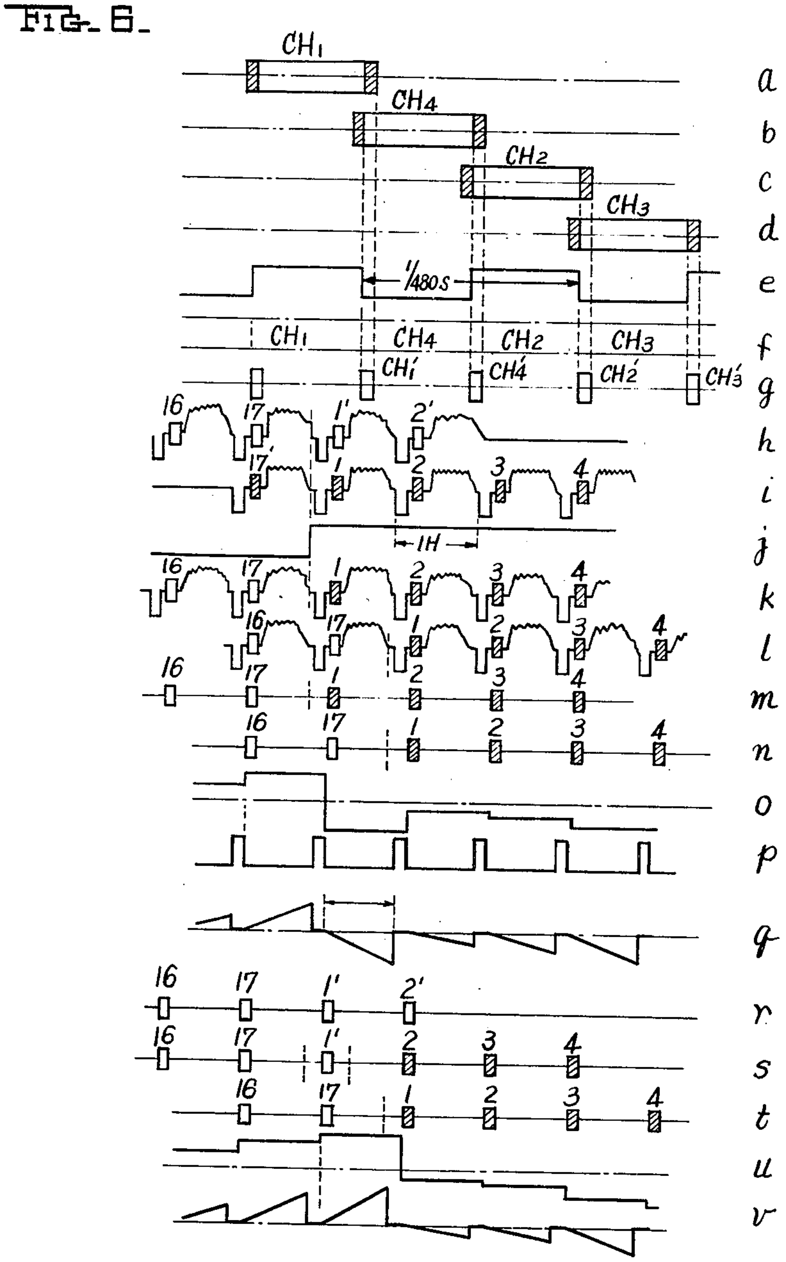
FIGS. 6 and 7 are wave form diagrams for explaining the function of equipment shown in FIG. 5.

In order to obtain a correct compenating signal at the discontinuous point a burst signal 1' shown in wave form *h* of FIG. 6 must be derived and the phase comparison must be effected between the burst signals 17 and 1' as shown in wave forms *t* and *s* as explained above.

Figure 8:
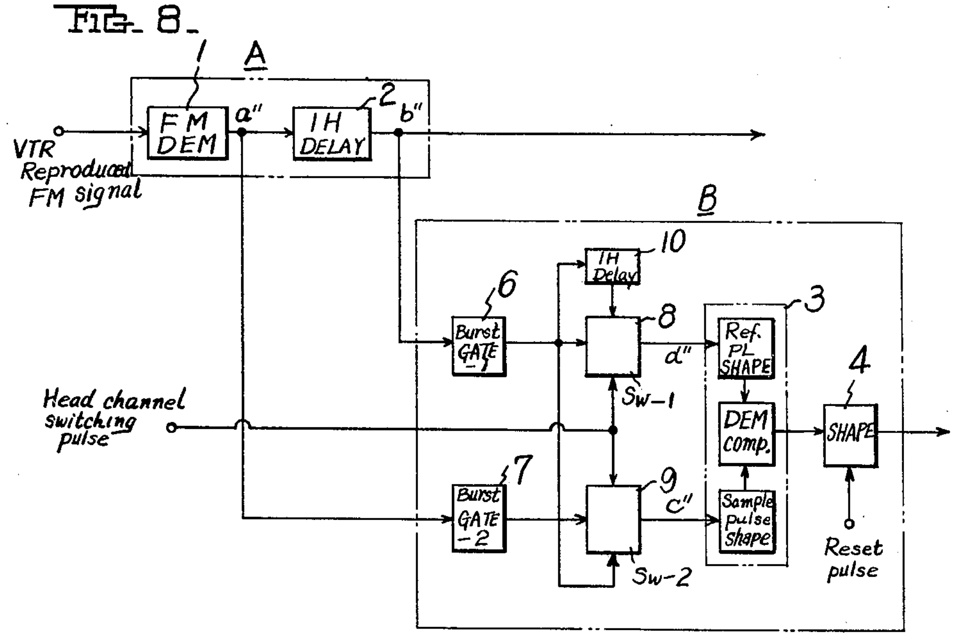
FIG. 8 is a block diagram of an automatic color phase deviation compensating equipment comprising a circuit for forming approximate linear interpolator type compensating signal at the proximity of head channel switching point of Ampex type four-head VTR equipment.
Figure 10:
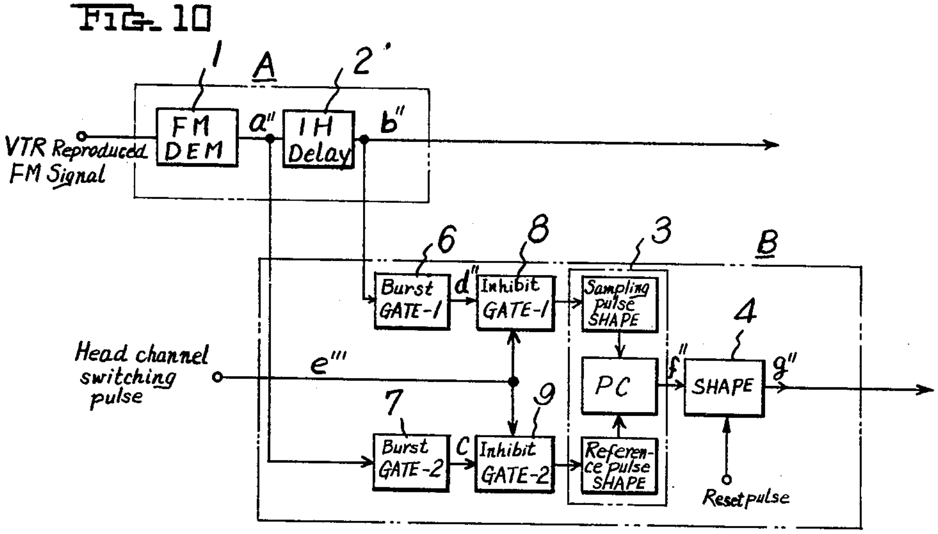
FIG. 10 is a block diagram of modified embodiment of compensating signal forming circuit shown in FIG. 8.

FIGS. 8 and 10 show modified embodiments of circuit diagram to prevent the forming an erroneous compensating signal at the discontinuous point caused by the head switching. In these modified embodiments the compensating signal at the relevant discontinuous portion is replaced by a preceding compensating signal based on a fact of a close approximation of these signals.

Figure 9:
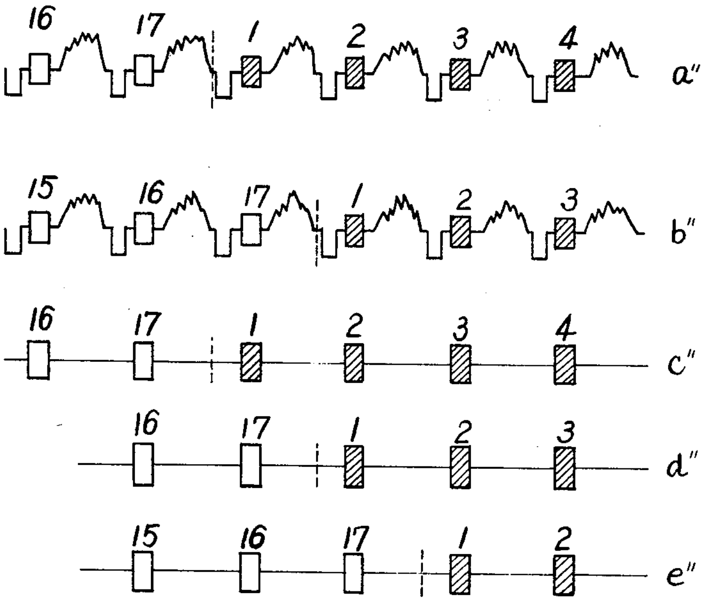
FIG. 9 shows several wave form diagrams for explaining the function of the equipment shown in FIG. 8.

Referring to FIG. 8 and the wave form diagram shown in FIG. 9, the reproduced FM signal reproduced by each reproducing head is fed to the FM demodulator 1 and 2 demodulated image signal *a''* is formed. This image signal *a''* is delayed by 1H period via the 1H delay circuit 2 and forms an image signal *b''*.

Each of burst signals *c''* and *d''* derived from said delayed image signal *b''* and non-delayed signal *a''* is supplied via switching circuits 9 and 8 to phase comparator stage "3" respectively. The vertical dotted line in wave forms represents the discontinuous position, therefore the preceding burst signal 17 and succeeding burst signal 1 from this line are derived from different reproducing heads. In this case a comparison of burst signal 1 and 17 is meaningless, but forms an erroneous compensating signal. Accordingly in this embodiment, as the compensating signal for the 17th image signal, which is succeeded by the discontinuous point a compensating signal for the 16th image signal is used. Since such adjacent image signals each having 1H period which are reproduced by same reproducing head include phase deviation of quite approximate relation, the above mentioned compensating signal does not cause any trouble in practice for the correction of the 17th image signal. In order to form a compensating signal of information signal succeeded by the discontinuous point, a switching pulse, which coincides to head channel switching position as shown dotted line in wave of FIG. 9*a''*, is applied to both of switching circuits 8 and 9, and 1H and 2H delayed burst signals shown in wave form *d''* and *e''* are selected and supplied to the phase comparator. The 2H delayed burst signal *e''* is derived from 2nd 1H delay circuit 10 by supplying it the 1H delayed burst signal *d''*.

In a summary the reference burst signal of this case is each of burst signals 17 and 16 shown in diagram *d''* and *e''*. By this comparison a compensating signal for the 16th horizontal period may be reproduced.

As explained by the embodiment shown in FIG. 8, the approximate compensating signal for the 17th image signal of 1H period including head channel switching point can be formed by utilizing a phase deviation signal detected by the phase comparator stage for the compensation of the 16th image signals.

Figure 11:
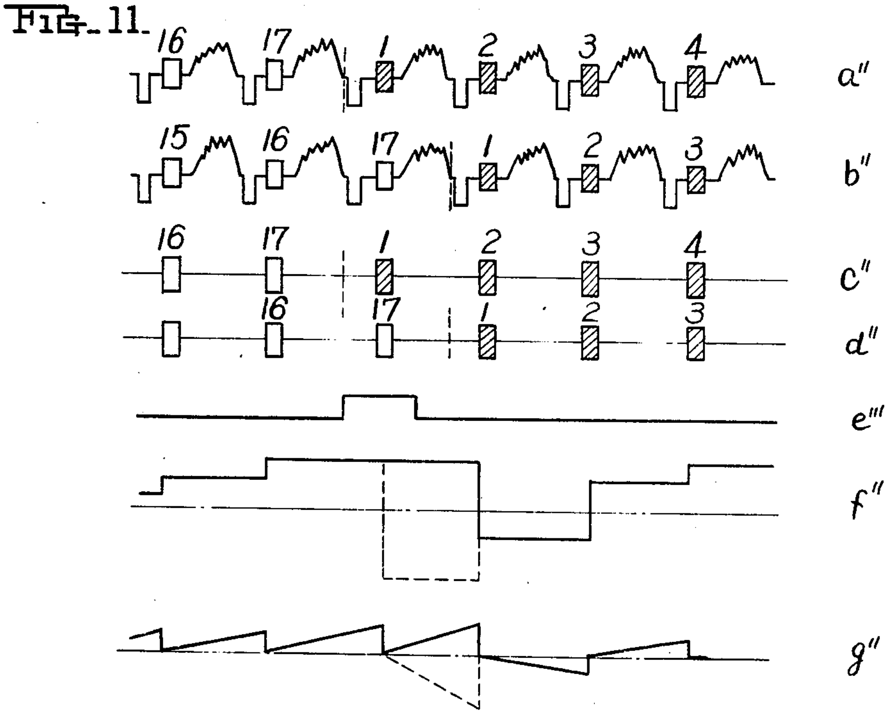
FIG. 11 shows several wave forms for explaining the function of the equipment shown in FIG. 10.

FIG. 10 shows another embodiment of such system and FIG. 11 is wave form diagram for explaining operation of FIG. 10. In this embodiment 1H delayed image signal *b''* and non-delayed image signal *a''* are produced as the same manner as described in FIG. 8. These signals are fed to burst gate circuits 6 and 7 and the burst signals *d''* and *c''* are separated.

These burst signals are fed to burst signal phase comparator stage 3 via inhibit gates 8 and 9 respectively and phase difference signal *f''* is derived therefrom. However, by a mere comparison of the burst signals *c''* and *d''*, an erroneous phase difference signal as shown by dotted line in wave form diagram *f''* may derived at the part of comparison of the burst signals 1 and 17 as described before, and the linear interpolator type compensating signal shaping circuit 4 produces an erroneous compensating signal which is shown by dotted line in wave form diagram *g''*. Accordingly in the embodiment of the invention a reproducing head switching pulse *e''*, which is synchronized with head channel switching position as shown by a dotted line in the wave form *a''*, is fed to both inhibit circuit 8 and 9, and thus suppress the burst signals 1 and 17 in the wave forms *c''* and *d''* which may cause the compensating error. As the result the comparison signal at the phase comparator stage 3 is not supplied and the wave form *f''* of the output of phase comparator is held as the preceding form. Accordingly, an approximate phase difference signal is obtained.

This wave form *f''* is supplied to linear interpolator type compensating signal shaping circuit 4 and the compensating signal having wave form *g''* is derived therefrom. By this manner, as for the compensating signal for 1H period of the 17th image signal in the wave form *b''*, a compensating signal which is identical to 16th compensating signal may be obtained.

The above mentioned compensating devices for phase deviation of color television reproduced signal (hue deviation) utilize a variable delay circuit which is controlled by the compensating signal, however, it is also possible to obtain a compensating system not using the variable delay circuit.

Some other embodiments of the time error compensating signal (color phase compensating signal to compensate color phase deviation in reproduced color signal) forming circuit according to the invention shown in FIG. 10

Each peak of this signal represents the extent of the phase deviation as shown in FIG. 3*b*.

5 is a color phase stabilizer, which makes comparison of the phase of the burst signal included in the color television signal with that of a stabilized reference subcarrier wave by the phase comparator PC. This phase comparator PC forms a zero-order hold type compensating signal which compensates the phase deviation at the time of each burst signal and holds the compensating signal for 1H period to form a wave form as shown in FIG. 3*d*. Then by an adder circuit ADD, the zero-order hold type compensating signal, having the wave form shown in FIG. 3*d*, is superposed with the linear interpolator type compensating signal as explained above and has the wave form shown in FIG. 3*c*. The superposed compensating signal is fed to a variable delay line VDL via a suitable $\gamma$ correction circuit. The variable delay line VDL is controlled by the superposed compensating signal. Thus, a phase deviated input signal to said variable delay line VDL is corrected by the compensating signals. The conventional system of the compensation inherently includes a substantial increase of compensating error close to the end of 1H period. However, according to the present invention the zero-order hold type compensating signal obtained by the phase comparator PC in color phase stabilizer and shown in FIG. 3*d* is added by a linear interpolator type compensating signal derived from shaping circuit 4 and shown in FIG. 3*c*, thus materially improves the compensation accuracy.

In accordance with the present invention it is possible to obtain a close approximating compensating signal to the 1H delayed reproduced signal shown in FIG. 3*a* by the dotted line by adding the signals shown in FIGS. 3*c* and 3*d* in the adder circuit ADD. Accordingly it is possible to compensate the phase deviation of the reproduced color television signal, which passes said 1H delay circuit and is supplied to the variable relay line VDL, by supplying the above mentioned compensating signal to the variable delay line VDL and by controlling the delay time of said delay line VDL.

Figure 4:
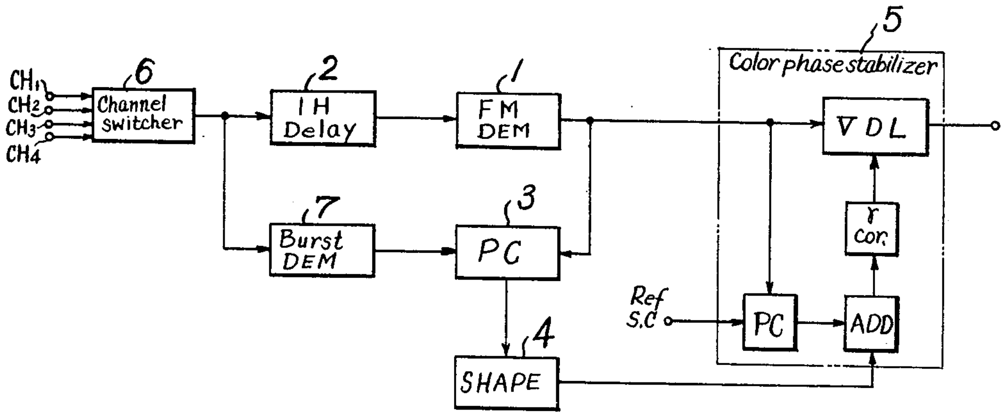
FIG. 4 is a block diagram according to another embodiment of the invention for deriving 1H delayed burst signal and non-delayed burst signal.

FIG. 4 is a different embodiment of FIG. 2, in which a reproduced FM signal modulated by a color television signal from the VTR equipment is fed via a channel switcher 6 for switching the reproducing heads in the VTR equipment to 1H delay circuit 2. Then the 1H delayed FM signal is fed to FM demodulator 1, and the color television signal is obtained therefrom. The obtained color television signal is supplied on one hand to an input terminal of the variable delay line VDL in the color phase stabilizer 5 and on the other hand to an input terminal of the phase comparator 3. The other input signal of the phase comparator 3 is derived from the non-delayed FM signal by a burst signal FM demodulator 7. In this embodiment the FM demodulator 1 and the burst signal FM demodulator 7 are added in the basic embodiment for one channel so that the 1H delay line may be economized per channel. The operation of this circuit is the same as explained with reference to FIG. 2 so that more detailed explanation is not required.

In a lateral scanning type four-head VTR equipment such as Ampex type equipment, a continuous signal is not derived by one reproducing head, but a signal corresponding to each ¼ part of a part of the continuous signal is derived per one reproducing head, so that the partial outputs from the four reproducing heads are switched in succession by the channel switcher to form a continuous signal. Said partial signal consists of 17H period. Accordingly, phase deviation of the reproduced signal is not a continuously varying property as shown in FIG. 3*a*, but a discontinuous point at each switching position after each of the output signals of the four heads. In accordance with the invention it is necessary as shown in FIGS. 2 and 3, to compare the phases of burst signals belonging to the same partial signal as 1H delayed and non-delayed signals and to obtain a correct linear interpolator type compensating signal. However according to the reason explained as above it is meaningless to obtain the linear interpolator type compensating signal by comparing phases of adjacent burst signals in the composite signal which is derived from different reproducing heads. In this case a discontinuous point is included in the obtained signal due to the switching of heads. If we use such compensating signal an erroneous correction may be effected.

FIG. 5 is a block diagram of an automatic color phase deviation compensating equipment provided with a means for forming a correct compensating signal said notwithstanding said head switching. FIG. 6 shows various wave forms in the equipment of FIG. 5. In these figures, an FM signal recorded in a magnetic tape is intermittently reproduced by each of the four reproducing heads such as shown by curves *a, b, c, d* of FIG. 6. These reproduced signals are switched in order of succession by RF switcher RFS (FIG. 5) to form a continuous signal *f*. Said switching of the RF switcher RFS is controlled by a gate signal shown in FIG. 6*e*. By this switching the cross-hatched overlapping portions located at the top and tail of each of the partial signals *a, b, c* and *d* are removed and the unhatched portions of each of the partial signals are combined so as to form the continuous composite signal *f* at the output of the RF switcher RFS. In FIG. 6, *h* and *i* show the overlapping portion of the two partial signals in greatly enlarged scale. These signals *h* and *i* are shown in a form of image signal for a sake of illustration, but actually these signals at the overlapping portion are modulated on the radio frequency. Right hand portion of the signal *h* from a dotted line, which is derived from an edge of a pulse *j* corresponding to the wave *e*, and left hand portion of signal *i* from the dotted line are both cut off by the switching at the RF switcher RFS. The signal *f* is demodulated by FM demodulator 1. The resultant composite signal *k* contains burst signals 16, 17, 1, 2, 3 . . .In this signal *k* the overlapping burst signals 17′, 1′ and 2′ are cut off by the switching. As can be seen from the figures there is a discontinuous point between the burst signals 17 and 1 due to the head switching operation.

The obtained image signal *k* is fed to 1H delay circuit 2 and 1H delayed image signal *l* is derived therefrom. The image signals *k* and *l* are supplied to burst gate circuits 7 and 6 and the respective burst gate signals *m* and *n* are separated. The burst signal *n* is directly supplied to a reference shape circuit of the phase comparator 3 and the burst signal *m* is supplied to a burst switcher, the output of which is connected to a sampling pulse shaping circuit in the phase comparator 3.

The reproduced RF signals *a, b, c* and *d* from the reproducing heads are also fed to RF gate circuit RFG. This circuit RFG has nearly the same construction with that of the RF switcher RFS. From the output of the switcher RFG also a continuous composite signal *g* is obtained. However, this switcher RFG has a different switching time from that of the switcher RFS. Each switching time of the RF gate RFG is made later for more than 1H period from that of the RF switcher RFS. Thus, the output signal *g* from the RF gate RFG contains trailing portions $CH_1'$, $CH_4'$, $CH_2'$ and $CH_3'$ of the partial signals. This signal *g* is supplied to a burst demodulator then to a burst gate-3. From the burst gate-3 signal *r*, consisting of a series of the burst signals . . . 16, 17, 1′, 2′, 3, 4 . . . is obtained. As can be seen from the foregoing explanation there is no discontinuous point between the burst signals 17 and 1′. This signal *r* is supplied to another input of the burst switcher. This burst switcher, if not controlled from burst gates 3, tends to switch out the signal *m* consisting of a series of burst signals . . . 16, 17, 1, 2, 3 . . . including the discontinuous point. But at the time of head switching, it switches out a burst signal from the signal *r*, so that a series of burst signals 16, 17, 1′, 2, 3 . . . as shown in *s* will be described hereinafter, but the systems shown in FIGS. 5 and 8 may also be applied in the same manner.

Figure 12:
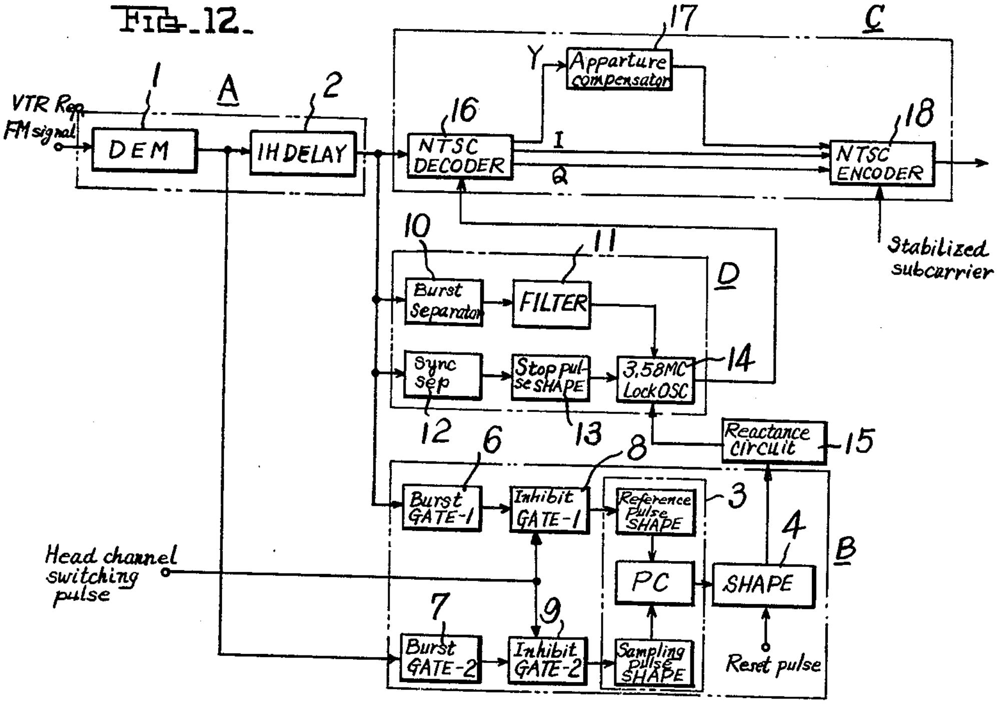
FIG. 12 is a block diagram of color phase deviation compensating equipment of a color television signal of encoding and decoding system which is applied linear interpolator type compensating signal forming circuit as shown in FIG. 10.

FIG. 12 is a practical embodiment of the time base compensating signal forming circuit according to the invention for a color phase deviation compensating system of color television signal, which is called encoder-decoder system developed by Ampex Co.[1] Said encoder-decoder system mainly consists of the circuit blocks C and D of FIG. 12. This system is utilizing a subcarrier oscillator controlled by the burst signal of reproduced color television signal, and by a decoder of NTSC signal the color television signal is separated into a brightness signal Y and two color signals I and Q, then these signals are encoded by a stabilized sub-carrier wave and a NTSC signal is formed. In this system color phase stabilization is maintained by above mentioned process of the signal.

However, in this system, the burst controlled oscillator is controlled at each burst signal for the oscillating phase and the phase is maintained during 1H period. Although a correct color phase compensation is possible at the position of burst signal position, but the new color phase deviation between the adjacent burst signal cannot be compensated. According to the invention linear interpolator compensating signal is form from circuit blocks A and B as explained with reference to FIG. 10. Then a variable reactance circuit 15, which may be formed for instance by varicap or reactance tube, is controlled thereby, and thus the oscillating phase of burst controlled oscillator 17 for the period between adjacent burst signal is controlled. In this system the color phase deviation of the reproduced signal is compensated in a high accuracy by a linear approximation.

As explained above in the system of the present invention, a phase deviation during 1H period of a reproduced color television signal is compensated by the linear interpolator type compensating signal having a gradient of level corresponding to the phase deviation during the 1H period in addition to the zero-order hold type compensating signal having a level to compensate the phase of the signal at the beginning of the 1H period. In the known system in which the phase deviation of a color television signal is compensated in a step-wise manner of the each step corresponding to 1H period, no effect is obtained for a phase deviation occurred during a 1H period. In acordance with the present invention a precise compensation can be obtained also for such a phase deviation occurred during a 1H period, thus a great improvement may be obtained for the reproducing quality of a color television signal from a VTR equipment.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

[1] Reference is made to: Charles E. Anderson and Joseph Raizen, SMPTE, vol. 68, No. 10, 1959, page 667, and U.S. patent specification No. 3,120,576.

What we claim is:

1. A compensating system for a color phase deviation of a VTR reproduced color television signal comprising in combination, a 1H delay means for delaying said signal for 1H period, a means for producing a phase difference signal having an amplitude corresponding to a phase difference between adjacent burst signals included in the non-delayed and the 1H delayed signals derived from an input and an output of the 1H delay means wherein said amplitude is held for 1H period, a wave form shaping means for shaping said phase difference signal to form a linear interpolator type compensating signal having a gradient of level corresponding to the level of the phase difference signal, and a color phase stabilizer means, comprising a phase comparator circuit for producing a zero-order hold type compensating signal by a comparison between burst signals of the 1H delayed signal with that of a reference subcarrier wave, an adder circuit for adding the linear interpolator type compensating signal derived from said wave form shaping means and the zero-order hold type compensating signal derived from said phase comparator circuit to form a composite compensating signal, and a variable time base adjusting means controlled by the composite compensating signal so as to compensate the color phase deviation of the 1H delayed color television signal.

2. A compensating system as claimed in claim 1, wherein the VTR reproduced color television signal is an FM signal and the phase comparator circuit is supplied with 1H delayed and non-delayed signals via respective FM demodulators.

3. A compensating system as claimed in claim 1, wherein the reproduced VTR color television signal is derived from a plurality of the reproducing heads each producing a partial signal and the partial signals are switched in succession by a switcher to form a composite signal, comprising a second switcher circuit for gating out the plurarty of the signals in slightly different switching time from that of the first composite signal, and a burst switching circuit supplied with the burst signals derived from the first and second composite signals via respective burst gate circuits, the burst switching circuit operates at each time of switching of the reproducing heads during which time the first reproduced composite signal contains a discontinuous point of color phase deviation so as to supply to the phase difference signal producing means a burst signal of the second composite signal thus the phase difference signal represents a phase difference value of the reproduced signal irrespective of the presence of the discontinuous point due to the head switching.

4. A compensating system as claimed in claim 1, comprising a first switcher means included in a circuit which suppled the non-delayed reproduced color television signal to the phase difference signal producing means, and a second switcher means included in a circuit which supplies the 1H delayed reproduced color television signal to said phase difference producing means, the 1H delayed color television signal branched from an input terminal of the second switcher means is further supplied directly to the first switcher means and also supplied back to the second switcher means via a second 1H delay means, said switchers are controlled by a pulse controlling the switching time of the switcher for switching the reproducing head so as to form a linear interpolator type compensating signal at the time of discontinuity caused by the head switching from a comparison between 2H delayed and 1H delayed burst signals both of which are reproduced from same reproducing head.

5. A compensating system as claimed in claim 4, wherein first and second inhibit gates are used in the circuit at the place of the switches.

References Cited

UNITED STATES PATENTS

| | | | |
|---|---|---|---|
| 2,960,563 | 11/1960 | Anderson | 178—5.4 |
| 3,075,041 | 1/1963 | Roizen | 178—5.4 |
| 3,100,816 | 8/1963 | Coleman | 178—5.4 |
| 3,103,553 | 9/1963 | Newell | 178—5.4 |
| 3,213,192 | 10/1965 | Jensen | 178—5.4 |

ROBERT L. GRIFFIN, Primary Examiner

J. C. MARTIN, Assistant Examiner

U.S. Cl. X.R.

178—6.6; 179—100.2